United States Patent [19]
Spilner

[11] 3,895,142
[45] July 15, 1975

[54] NAILABLE, WEATHER-RESISTANT LAMINATED PLASTIC SHEET
[75] Inventor: Allan John Spilner, Gladwyne, Pa.
[73] Assignee: Rohm and Haas Company, Philadelphia, Pa.
[22] Filed: July 18, 1973
[21] Appl. No.: 380,425

[52] U.S. Cl................ 428/38; 428/463; 260/876 R
[51] Int. Cl..... B32b 3/24; B32b 27/12; B32b 27/30
[58] Field of Search....... 161/165, 218, 89, 95, 217, 161/404, 255, 256; 260/876 R

[56] References Cited
UNITED STATES PATENTS

| | | | |
|---|---|---|---|
| 3,297,461 | 1/1967 | Siddall | 161/89 X |
| 3,582,449 | 6/1971 | Stolki | 161/89 |
| 3,586,594 | 6/1971 | Stolki | 161/218 |
| 3,793,402 | 2/1974 | Owens | 260/876 R |

Primary Examiner—George F. Lesmes
Assistant Examiner—Ellis P. Robinson
Attorney, Agent, or Firm—Michael B. Fein

[57] ABSTRACT

A nailable, weather-resistant laminated plastic sheet comprising an inner web of metal strands and a transparent outer matrix of a blend of a first polymer polymerized from a monomer system containing at least about 90 weight percent methyl methacrylate and a second polymer which is a three stage acrylic composite interpolymer.

2 Claims, 2 Drawing Figures

NAILABLE, WEATHER-RESISTANT LAMINATED PLASTIC SHEET

This invention relates to a flexible reinforced plastic sheet material and to a method for forming this material. More particularly this invention relates to a laminated plastic sheet material comprising an inner web of metal strands and a transparent outer matrix of a blend of a first polymer polymerized from a monomer system containing at least about 90 weight percent methyl methacrylate and a second polymer being a three stage acrylic composite interpolymer.

Sheets of flexible reinforced laminated plastic material are finding increasing use in a wide variety of applications today, i.e., greenhouses, barns, temporary building, weather-proofing large buildings under construction, as a covering material for materials stored in the open such as lumber, grain, hay, and many other uses. The plastic materials which have been used heretofore have included polyethylene, polystyrene or high impact polystyrene, acrylonitrile-butadiene-styrene type plastics (ABS), polyvinyl chloride (PVC), and the like, See the following U.S. Pat. Nos.: 2,763,586, 3,030,255, 3,068,043, 3,073,004, 3,297,461, 3,523,867, 3,582,446, 3,582,449, 3,582,450, 3,582,451, 3,586,594, 3,607,594, 3,616,130, and 3,627,613.

Despite the large number of prior patents disclosing reinforced thermoplastic materials, no one to applicant's knowledge has previously disclosed a laminated metal reinforced plastic sheet which is a transparent, highly weatherable composite which can be nailed without predrilling. Such a material would be eminently useful for the above mentioned uses.

It is an object of this invention to provide a reinforced laminated plastic sheet material which is nailable, transparent and highly weatherable. It is a further object of this invention to provide an efficient process for manufacturing a reinforced laminated sheet material.

These and other objects as will become apparent are achieved in a flexible reinforced laminated plastic sheet material comprising an inner web of metal strands and a transparent outer matrix of a blend of two polymers having about 10 to 99 weight percent of a first polymer and about 1 to 90 weight percent of a second polymer, the first polymer polymerized from a monomer system containing about 80 to 100 weight percent $C_1$ to $C_4$ alkyl methacrylate and 0 to 10 weight percent $C_1$ to $C_4$ alkyl acrylate, said second polymer being a three stage composite inter-polymer having about 10 to 40 percent by weight of a non-elastomeric relatively hard first stage polymerized from a monomer system comprising about 80 to 100 weight percent $C_1$ to $C_4$ alkyl methacrylate and about 0 to 20 weight percent alkyl acrylate; and about 20 to 60 percent by weight of an intermediate elastomeric stage polymerized in the presence of a composition containing the first stage from a monomer system comprising about 50 to 99.95 weight percent of an alkyl acrylate, about 0.05 to 5 weight percent copolymerizable graft linking monomer and 0 to about 5.0 weight percent of a copolymerizable crosslinking monomer; and having about 10 to 70 percent by weight of a final stage polymerized in the presence of a composition containing the second stage from a monomer system comprising the monomers described herein for the first stage.

Figure 1:
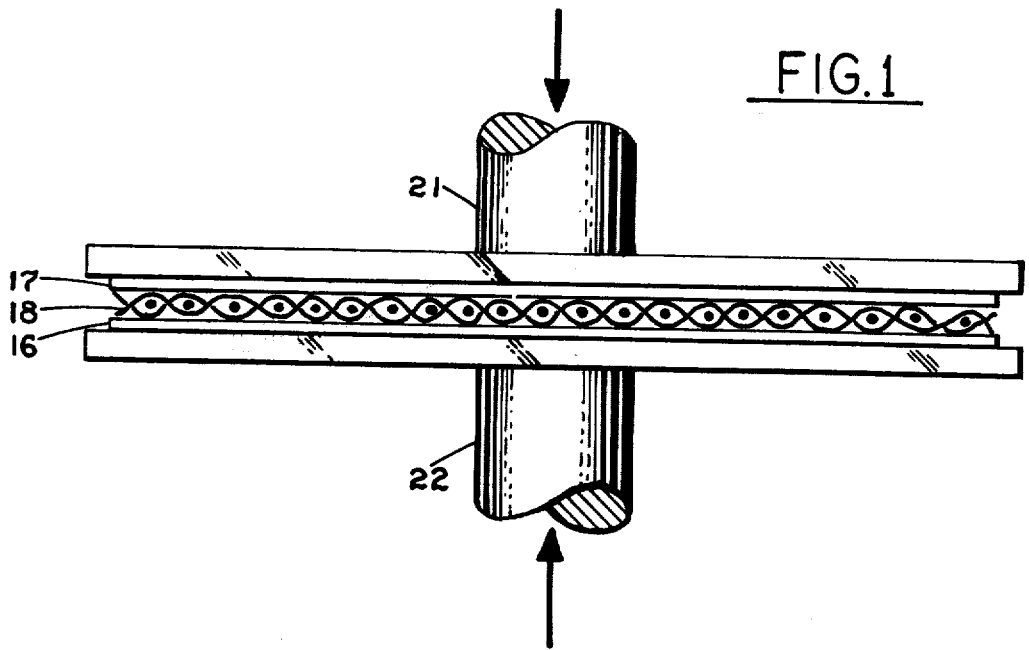
FIG. 1 is an elevational perspective view of an embodiment of the laminate of the present invention with portions broken away.
Figure 2:
FIG. 2 is a cross-sectional view of the laminate of the invention.

Referring to the drawings, FIG. 2 shows the reinforced laminated sheet material designated generally by the numeral 15. Laminate 15 is formed by pressing between the heated platens of a press, 21 and 22, an upper sheet or laminae of plastic material 17, and a lower sheet 16, having an inner web of metal strands of reinforcing material 18, received between the two sheets of plastic material. The preparation of the plastic sheet material is described by Owens in U.S. Ser. No. 196,194 of Nov. 15, 1971 now U.S. Pat. No. 3,793,402, the disclosure of which is hereby incorporated by reference.

The web of metal strands 18 may be made up of woven or non-woven strands in an open mesh network. The strands may be composed of monofilament material or multifilament material. The preferred thickness of the web of metal is about 20 to 100 mils.

A wide range of temperatures may be utilized to laminate the upper and lower sheets of plastic together to form a matrix. A preferred surface temperature range is about 300° to 400°F. A temperature in this range will produce a good bond between the upper and lower sheets 16 and 17. The laminating pressure utilized ideally is about 350 to 400 psi.

In one embodiment of the present invention a laminated plastic sheet was made utilizing two sheets of a material known as Plexiglas DR which is a blend of two polymers, a first polymer consisting essentially of a 90/10 copolymer of methylmethacrylate (MMA) and ethylacrylate (EA). The second polymer is a three stage graft interpolymer having a first stage polymerized from a 96/4 mixture of MMA and EA and additionally containing 0.2 parts of allyl methacrylate crosslinking monomer. The second stage consists of butylacrylate (BA), styrene (S), and hydroxypropyl methacrylate (HPMA), in the ratio of 36/8/1 with 1 part of allylmethacrylate (ALMA). The final stage is essentially MMA and EA in a ratio of 96:4. The ratios of the stages to each other are 35:45:20.

A laminate was made by using a press 21 and 22 at 350°F. and 450 psi, and two 0.06 inch thick sheets of Plexiglas DR with the reinforcing web in between. The reinforcing web 18 is made of steel wire having a diameter of 37 mils, and a maximum thickness of 75 mils at the twists of the wire. An excellent bond was achieved at the inner face of the layers. The ideal thickness of the laminate, taken in a traverse direction, is about 125% of the maximum thickness of the reinforcing web, and ideally about 70 to 100 mils. The sheet was nailed and exposed to weathering tests and transparency tests with the results as follows: The sheet retained essentially the same impact strength after having been exposed to outdoor weathering for 18 months, with essentially no loss in transparency due to weathering.

The foregoing disclosure and description of the invention is illustrative and explanatory thereof and in the light thereof other modifications will be apparent to those skilled in the art.

What is claimed:

1. A nailable, weather-resistant laminated plastic sheet comprising an inner web of metal strands and a transparent outer matrix of a blend of about 10 to 99 weight percent of a first polymer polymerized from a monomer system containing about 80 to 100 weight percent $C_1$ to $C_4$ alkyl methacrylate and 0 to 20 weight percent $C_1$ to $C_4$ alkyl acrylate and about 1 to 90 weight percent of a second polymer, said second polymer being a three-stage composite interpolymer having about 10 to 40 percent by weight of a nonelastomeric relatively hard first stage polymerized from a monomer system comprising about 80 to 100 weight percent $C_1$ to $C_4$ alkyl methacrylate and about 0 to 20 weight percent $C_1$ to $C_8$ alkyl acrylate; having about 20 to 60 percent by weight of an intermediate elastomeric stage polymerized in the presence of a composition containing the first stage from a monomer system comprising about 50 to 99.95 weight percent of a $C_1$ to $C_8$ alkyl acrylate, about 0.05 to 5 weight percent copolymerizable graftlinking monomer, and 0 to about 5.0 weight percent copolymerizable cross-linking monomer; and about 10 to 70 percent by weight of a final stage polymerized in the presence of a composition containing the second stage from a monomer system comprising the monomers described herein for the first stage.

2. The laminate of claim 1 wherein the total transverse thickness is about 70 to 100 mils.

* * * * *